(12) United States Patent
Johnson

(10) Patent No.: US 10,834,930 B2
(45) Date of Patent: Nov. 17, 2020

(54) HUNTING KNIFE WITH SKINNING APPLIANCE

(71) Applicant: Michael Johnson, Amarillo, TX (US)

(72) Inventor: Michael Johnson, Amarillo, TX (US)

(*) Notice: Subject to any disclaimer, the term of this patent is extended or adjusted under 35 U.S.C. 154(b) by 0 days.

(21) Appl. No.: 16/833,746

(22) Filed: Mar. 30, 2020

(65) Prior Publication Data
US 2020/0221716 A1   Jul. 16, 2020

Related U.S. Application Data

(63) Continuation-in-part of application No. 15/908,584, filed on Feb. 28, 2018, now Pat. No. 10,517,307.

(51) Int. Cl.
*A22B 5/00* (2006.01)
*A22B 5/16* (2006.01)
*B26B 9/02* (2006.01)

(52) U.S. Cl.
CPC .............. *A22B 5/168* (2013.01); *B26B 9/02* (2013.01)

(58) Field of Classification Search
CPC ....... A22B 5/00; A22B 5/0017; A22B 5/0023; A22B 5/0029; A22B 5/0047; A22B 5/168
USPC ................................................ 452/125, 132
See application file for complete search history.

(56) References Cited

U.S. PATENT DOCUMENTS

| | | | | |
|---|---|---|---|---|
| 1,546,975 A * | 7/1925 | Feller | ................... | A22C 25/006 30/286 |
| 1,552,153 A * | 9/1925 | Hartbauer | ................. | B26B 3/06 30/287 |
| 4,172,306 A * | 10/1979 | Hopkins | ................. | A47G 21/06 452/6 |
| 4,442,570 A * | 4/1984 | Lynn | ..................... | A22C 29/024 30/314 |
| 4,707,920 A * | 11/1987 | Montgomery | ............ | B26B 3/06 30/294 |
| 6,745,477 B2 * | 6/2004 | Gray | .................. | A22C 17/0013 30/304 |
| 7,214,127 B1 * | 5/2007 | Thompson | ............. | A22B 5/168 452/103 |
| 7,578,731 B1 * | 8/2009 | Moore | ................. | A22B 5/0047 452/103 |
| 8,066,557 B2 * | 11/2011 | Tarrant | ................. | A22B 5/0047 452/107 |
| 8,152,606 B2 * | 4/2012 | Jamison | ................. | A22B 5/168 452/125 |
| 8,419,510 B2 * | 4/2013 | Neal | .................. | A22C 21/0069 452/135 |

(Continued)

*Primary Examiner* — Richard T Price, Jr.
(74) *Attorney, Agent, or Firm* — William Lovin & Assoc. LLC; William R. Lovin

(57) ABSTRACT

A tool, and a method using the tool, for skinning game animals. Specifically, the tool relates to a curved blade knife, sharpened on the curved, top edge, and possessing a spherical or non-spherical structure at the tip. The tool is used by forming a cut through the soft skin of a game animal, inserting the spherical or non-spherical structure through the cut, and pushing or pulling the blade such that the sharpened curved, top edge cuts through the skin and connective tissue. This tool and method takes advantage of the fact that the spherical or non-spherical structure at the tip of the blade is retained inside the skin and connective tissue of the game animal and the blade is automatically properly positioned to cut the skin of the game animal.

12 Claims, 3 Drawing Sheets

(56) References Cited

U.S. PATENT DOCUMENTS 8,992,289 B2 * 3/2015 Ramos ..................... B26B 9/00
452/132

* cited by examiner

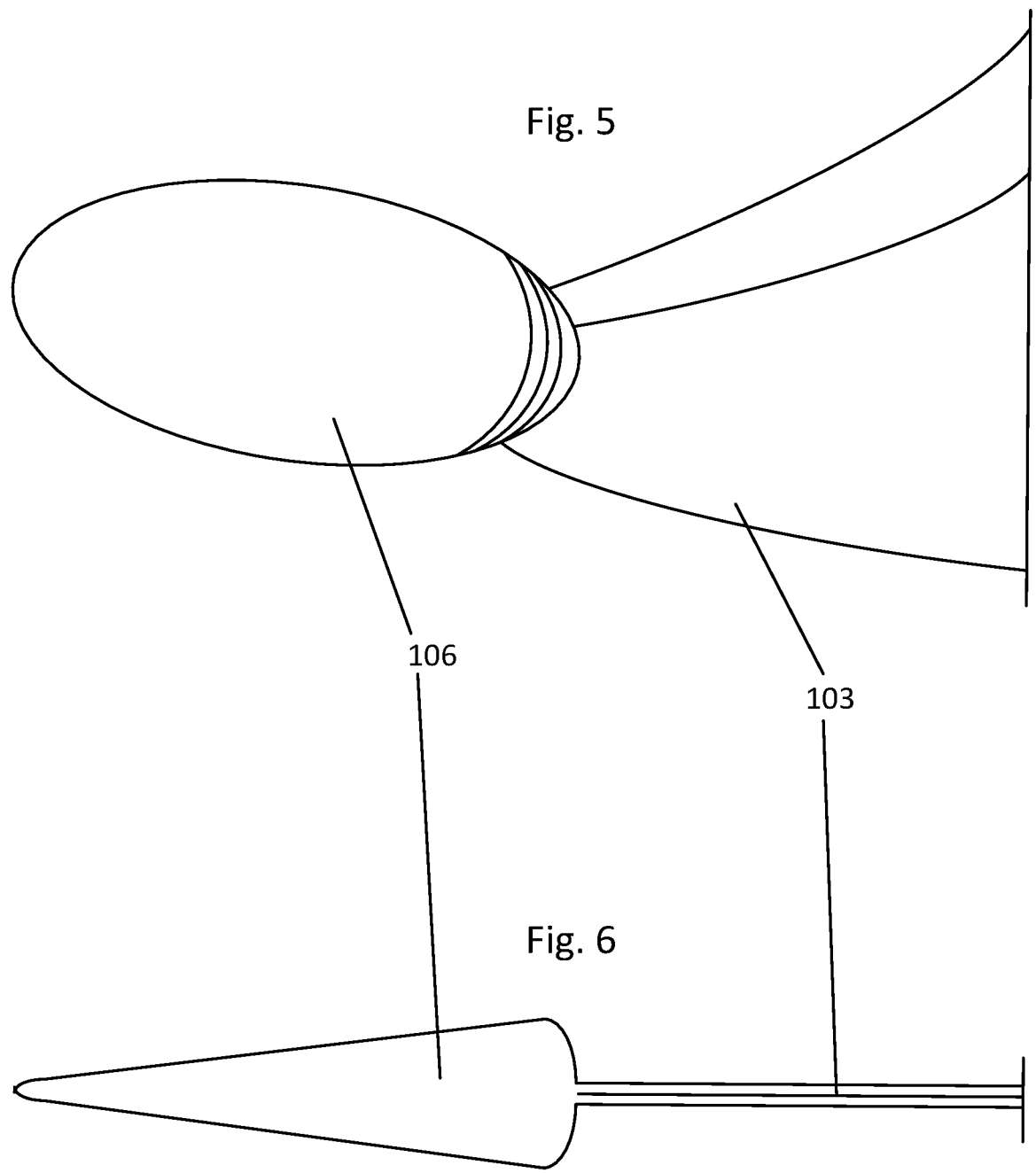

HUNTING KNIFE WITH SKINNING APPLIANCE

CROSS-REFERENCE TO RELATED APPLICATIONS

This is a continuation-in-part of U.S. Pat. No. 10,517,307 issued on Dec. 31, 2019.

FIELD OF THE INVENTION

The present invention relates to a tool, and a method using the tool, for skinning game animals. Specifically, the present invention relates to a curved blade knife, sharpened on the curved, top edge, and possessing a sphere or a non-spherical element at the tip. The tool is used by forming a cut through the soft skin of a game animal, inserting the spherical or non-spherical tip through the cut, and pushing or pulling the blade such that the sharpened curved, top edge cuts through the skin. This tool and method takes advantage of the fact that because the spherical or non-spherical tip is partially retained inside the skin and connective tissue of the game animal, the blade is properly positioned to cut the skin and subordinate connective tissue of the game animal.

BACKGROUND OF THE INVENTION

Currently, the method of skinning a game animal after death is very generic: The hunter uses a knife to incise and remove the skin and underlying connective tissue of the animal. The chief difficulty has to do with controlling the depth of the incision used to remove the skin and connective tissue. Such incisions tend to be long and shallow and are difficult to make using a straight bladed knife.

What is needed then is a knife with a spherical or non-spherical tip such that the spherical or non-spherical tip is retained beneath the connective tissue of the skin as the knife is moved to incise the skin and connective tissue.

What is also needed is a knife where the top edge of the blade is sharpened and the lower edge of the blade is unsharpened.

What is also needed is a knife with a concavely curved blade from tip to handle.

What is also needed is a knife with a puncturing tip for making a hole in the skin and connective tissue of the game animal.

Finally, what is needed is a method of using the above described knife to skin a game animal.

SUMMARY OF THE INVENTION

One embodiment of the present invention is a skinning knife with a blade and a handle both aligned lengthwise along a generally linear axis. In one embodiment of the present invention, the handle is comprised of external covers retained to the handle by means of screws. It will be readily apparent, however, that these external covers may be integrally formed along with the handle or may be adhesively or flexibly applied. For example, a textured rubber external cover may be flexibly applied to the handle of the skinning knife.

The blade of one embodiment of the present invention is sharpened along the top edge. The bottom edge of the blade is unsharpened and flat or curved in cross section for safety purposes. The sharpened top edge of the blade is concavely curved along its length from the handle to the tip. There is a spherical or non-spherical structure at the tip of the blade and a pointed, piercing structure on the same side of the blade just in front of the handle. The spherical or non-spherical structure is used to retain the tip of the blade in the puncture wound made where the skinning incision is to begin.

The handle and the blade may be jointed or fixed. In the case where they are jointed, the blade folds into the handle such that the sharpened top of the blade is insinuated inside the handle. In this case the spherical or non-spherical structure at the tip may be stored outside of the handle when the blade is closed.

The knife is used in the following manner: First, if the blade is jointed, the blade is rotated out of the handle and allowed to lock into a generally linear alignment with the handle. Next, the pointed piercing structure just in front of the handle is positioned against the soft skin of the game animal. Next the pointed piercing structure just in front of the handle is driven through the skin and connective tissue forming a puncture wound leading underneath the skin. Alternately, this incision may be made with the tip of a separate knife. Next, the knife and pointed piercing structure just in front of the handle are rotated such that the spherical or non-spherical structure at the tip of the blade is positioned inside the game animal in the puncture wound formed previously. Next, the user pushes or pulls the blade using the handle incising the skin and connective tissue of the game animal. The spherical or non-spherical structure at the tip of the blade retains the tip of the blade at the proper depth underneath the connective tissue to easily incise only the skin and connective tissue. Next, when the incision has been completed, the spherical or non-spherical structure at the tip of the blade is removed from the incision. Finally, if the blade is jointed, the blade is rotated into the handle.

BRIEF DESCRIPTION OF THE DRAWINGS

FIG. 5 is a view from the side of the blade tip of one embodiment of the present invention showing an ovoid structure at the tip of the blade.

FIG. 6 is a view from the top of the blade tip of one embodiment of the present invention showing an ovoid structure at the tip of the blade. The ovoid structure is thicker at the end attached to the tip of the blade.

DETAILED DESCRIPTION OF THE PREFERRED EMBODIMENT

Figure 1:
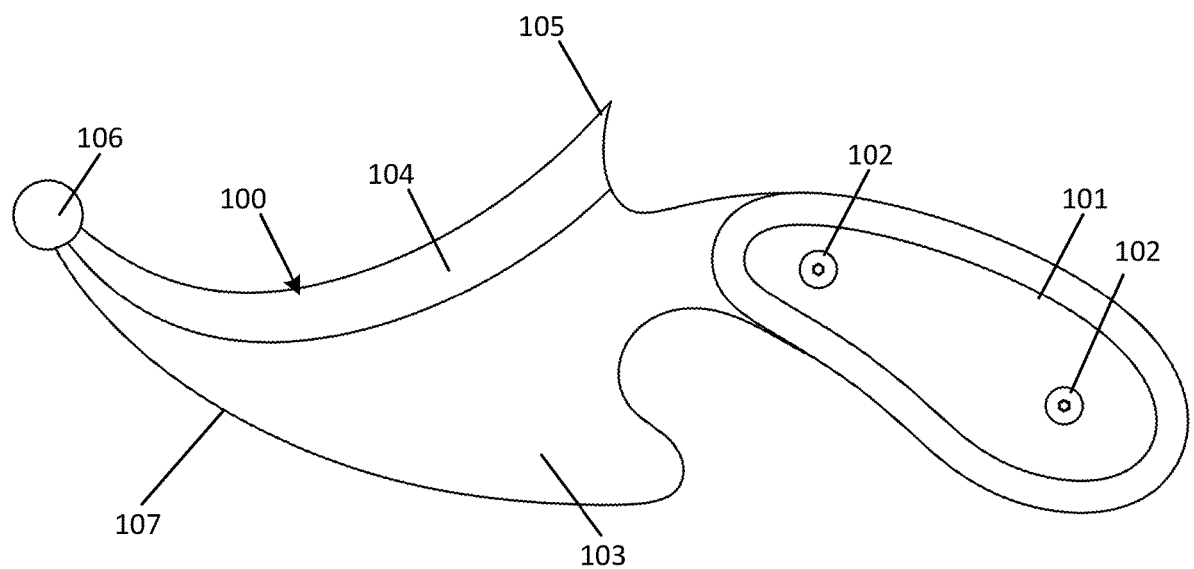
FIG. 1 is a view from the side of one embodiment of the knife of the present invention.
Figure 2:
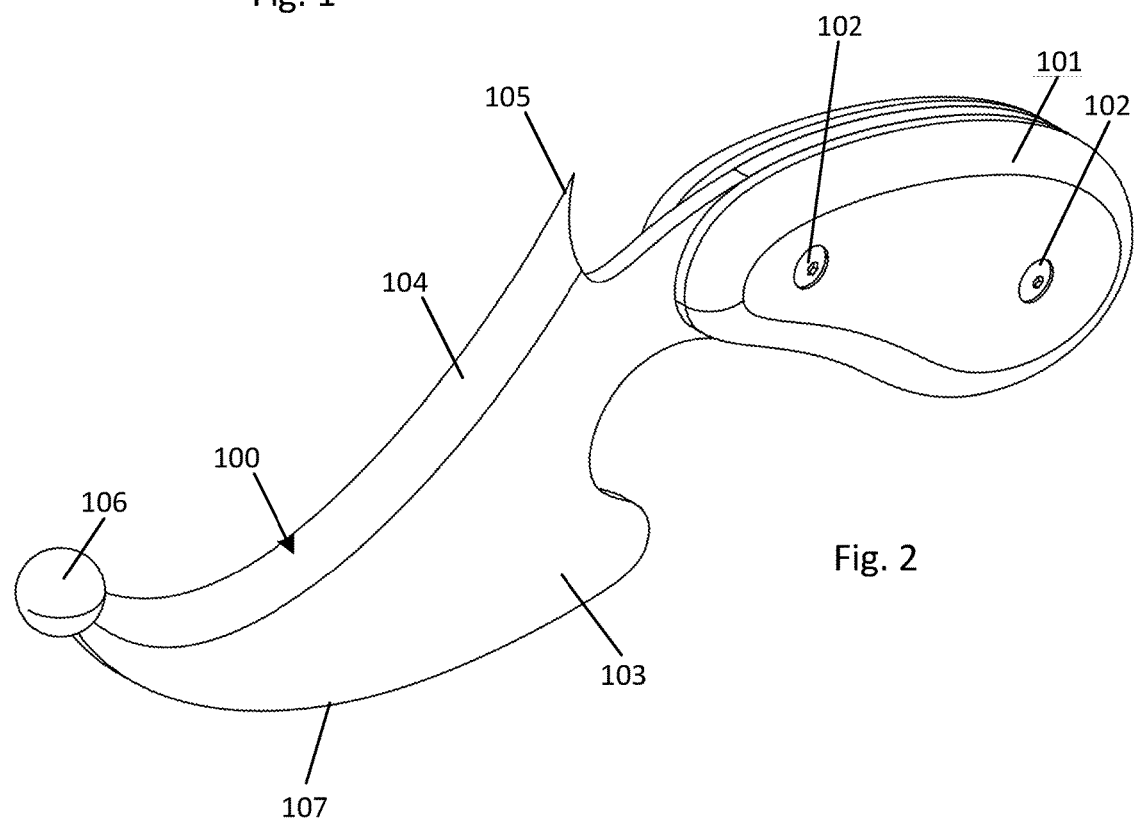
FIG. 2 is a perspective view from the top of the tip towards the handle of one embodiment of the knife of the present invention.
Figure 3:
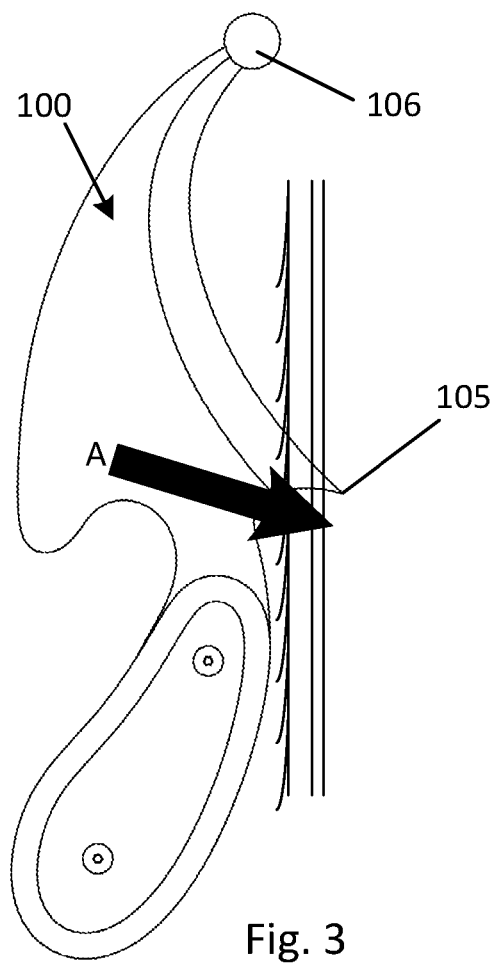
FIG. 3 is a view from the side of one embodiment of the present invention showing how the invention is used to make an initial puncture wound in the skin and connective tissue of the game animal's skin.
Figure 4:
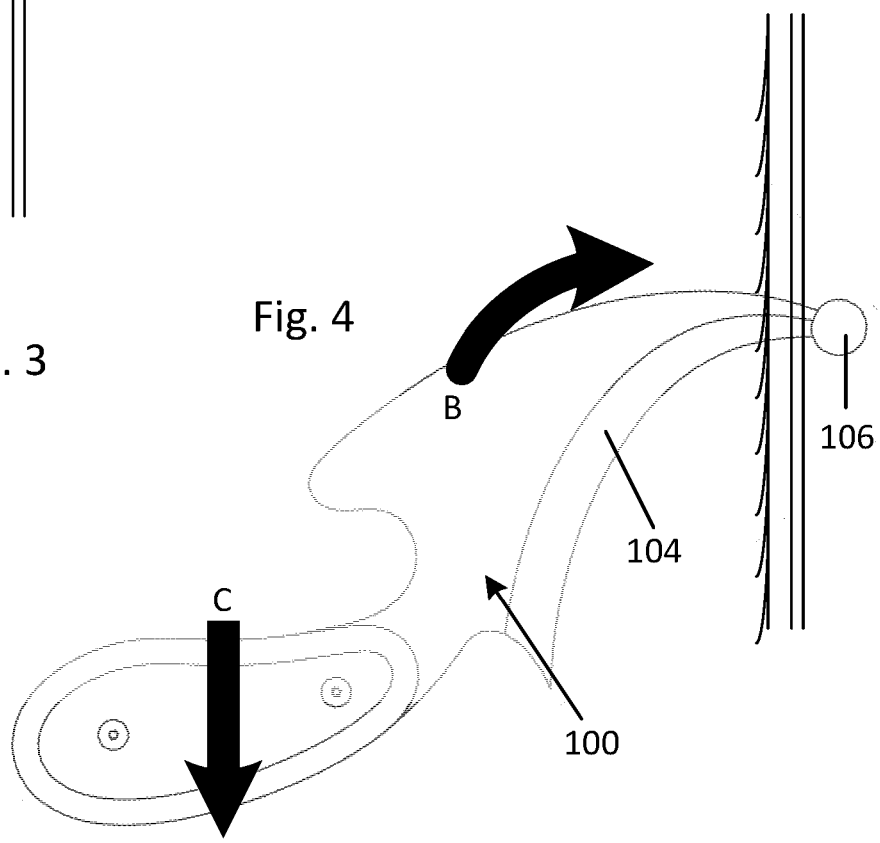
FIG. 4 is a view from the side of one embodiment of the present invention showing how the invention is rotated to place the spherical or non-spherical structure at the tip of the blade inside the initial puncture wound in the skin and connective tissue of the game animal and then pushed to create an incision thorough the skin and connective tissue of the game animal.

Turning now to FIGS. 1 and 2, one embodiment of the present invention is a skinning knife 100 with blade 103 and handle 101 both aligned lengthwise along a generally linear axis. In one embodiment of the present invention, handle 101 is further comprised of external covers retained to the handle by means of screws 102. It will be readily apparent that other fastening means may be used to attach the external covers, such as rivets or metal fixing posts hammered to form extrusions over a portion of the cover. It will also be readily apparent that these external covers may be integrally formed along with the handle or may be adhesively or flexibly applied. For example, a textured rubber external cover may be flexibly applied to handle 101 of the skinning knife.

Blade 103 of one embodiment of the present invention is sharpened on the curved top edge 104. Bottom edge 107 of blade 103 is unsharpened and flat or curved in cross section for safety purposes. Sharpened curved top edge 104 of blade 103 is concavely curved along its length from the handle to the tip. Spherical or non-spherical structure 106 is positioned at the tip of the blade and pointed, piercing structure 105 is positioned just in front of handle 101. In one embodiment of the present invention pointed, piercing structure 105 is absent from the invention.

Handle 101 and blade 103 may be flexibly jointed or fixed. In the case where they are flexibly jointed, blade 103 folds into handle 101 such that sharpened curved top edge 104 and pointed, piercing structure 105 of blade 103 are insinuated inside handle 101. In this case, spherical or non-spherical structure 106 at the tip may be stored outside of handle 101 when blade 103 is closed inside of handle 101.

Turning now to FIGS. 1 through 4, skinning knife 100 is used in the following manner: First, if blade 103 is flexibly jointed, blade 103 is rotated out of handle 101 and allowed to lock into a generally linear alignment with handle 101. Next, pointed, piercing structure 105 just in front of handle 101 is positioned against the soft skin of the game animal. Next, pointed, piercing structure 105 just in front of handle 101 is driven through the skin and connective tissue (Arrow A) forming a puncture wound leading underneath the skin. Next, skinning knife 100 and pointed, piercing structure 105 just in front of handle 101 are rotated (Arrow B) such that spherical or non-spherical structure 106 at the tip of blade 103 is positioned inside the game animal in the puncture wound formed previously. Next, the user pushes blade 103 using handle 101 (Arrow C) incising the skin and connective tissue of the game animal. Spherical or non-spherical structure 106 retains the proximal tip of the sharpened curved top edge 104 of blade 103 at the proper depth captured underneath the connective tissue to easily incise only the skin and connective tissue. Next, when the incision has been completed, spherical or non-spherical structure 106 at the tip of skinning knife 100 is removed from the incision. Finally, if blade 103 is jointed, then blade 103 is rotated into handle 101.

The present application explicitly includes all variants of the present invention readily apparent to a person having skill in the art. For example, spherical or non-spherical structure 106 at the tip of blade 103 may be formed in other cross-sections, including: 1) Ovoids; 2) Thickened plates; and, 3) Internally sharpened hooks. Also, the blade of one embodiment of the present invention is constructed of steel, but those having skill in the art will recognize that other substances may be used including: 1) Carbon fiber; and, 2) Ceramic. Also, the specification calls out pushing blade 103 through the skin and subordinate connective tissue. Clearly, embodiments where blade 103 is pulled are equally well contemplated and disclosed.

Spherical or non-spherical structure 106 may be solid or open and hollow in form. If open and hollow in form, the open structure may be formed of wires or curved rods. The ovoid shape referenced supra may also be solid or open in form. If open in form, the open structure may be formed of wires or curved rods. Also, the long axis of the ovoid form may be aligned linearly along a lengthwise axis of the blade 103 or at any angle with respect to a lengthwise axis of the blade 103 including tangentially or perpendicularly to a lengthwise axis of the blade 103. The thickened plate referenced supra may be uniformly thick or may have a varying shape and thickness. The thickened plate may be thicker at the end most distant from handle 101 or it may be thicker at the end most proximal to handle 101. Finally, the thickened plate may be any shape and oriented at any angle with respect to the blade 103.

For example, FIGS. 5 and 6 illustrate a side and top view of a solid, ovoid shaped structure 106 at the tip of blade 103. The ovoid shaped structure 106 is thicker at the end closest to blade 103 (where they are attached) and thinner at the end most distant from the blade 103 and the handle (not shown).

Also, blade 103 may not be affixed to a handle. It may exist only as a blade 103 which may be manually attached or affixed to a handle assembly.

What is claimed is:

1. A knife with a skinning appliance comprising a top sharpened blade with a spherically shaped structure at one end of the blade and a handle at the other end of the structure wherein the top sharpened edge is concavely formed further comprising an outwardly aligned pointed structure near the handle extending from the top sharpened blade.

2. A knife with a skinning appliance comprising a top sharpened blade with a non-spherically shaped structure at one end of the blade and a handle at the other end of the structure wherein the top sharpened edge is concavely formed further comprising an outwardly aligned pointed structure near the handle extending from the top sharpened blade.

3. A knife with a skinning appliance of claim 2 wherein the non-spherically shaped structure is ovoid in shape.

4. A knife with a skinning appliance of claim 3 wherein the long axis of the non-spherical, ovoid shape is parallel to the long axis of the blade.

5. A knife with a skinning appliance of claim 3 wherein the long axis of the non-spherical, ovoid shape is not parallel to the long axis of the blade.

6. A knife with a skinning appliance of claim 3 wherein the non-spherically shaped structure is a thickened plate.

7. A knife with a skinning appliance of claim 6 wherein the long axis of the thickened plate is parallel to the long axis of the blade.

8. A knife with a skinning appliance of claim 6 wherein the long axis of the thickened plate is not parallel to the long axis of the blade.

9. A knife with a skinning appliance of claim 6 wherein the terminal end of the thickened plate is thicker than the end attached to the blade.

10. A knife with a skinning appliance of claim 6 wherein the terminal end of the thickened plate is thinner than the end attached to the blade.

11. A knife with a skinning appliance of claim 1 wherein the blade may be manually attached or affixed to the handle.

12. A knife with a skinning appliance of claim 2 wherein the blade may be manually attached or affixed to the handle.

* * * * *